United States Patent
Agoda-Tandjawa et al.

(10) Patent No.: US 12,433,308 B2
(45) Date of Patent: Oct. 7, 2025

(54) SEAWEED FLOUR

(71) Applicant: Cargill, Incorporated, Wayzata, MN (US)

(72) Inventors: Gueba Agoda-Tandjawa, Baupte (FR); Helene Christelle Leroy, Baupte (FR); Aurelie Loaec, Baupte (FR); Jacques Andre Christian Mazoyer, Baupte (FR)

(73) Assignee: Cargill, Incorporated, Wayzata, MN (US)

( * ) Notice: Subject to any disclaimer, the term of this patent is extended or adjusted under 35 U.S.C. 154(b) by 853 days.

(21) Appl. No.: 17/284,222

(22) PCT Filed: Oct. 7, 2019

(86) PCT No.: PCT/US2019/054997
§ 371 (c)(1),
(2) Date: Apr. 9, 2021

(87) PCT Pub. No.: WO2020/076698
PCT Pub. Date: Apr. 16, 2020

(65) Prior Publication Data
US 2021/0337842 A1 Nov. 4, 2021

(30) Foreign Application Priority Data

Oct. 11, 2018 (EP) .................................... 18199778
Sep. 23, 2019 (EP) .................................... 19199003

(51) Int. Cl.
| | | |
|---|---|---|
| A23L 17/60 | (2016.01) | |
| A23C 9/154 | (2006.01) | |
| A23K 10/30 | (2016.01) | |
| A23L 33/105 | (2016.01) | |
| A23P 10/40 | (2016.01) | |

(52) U.S. Cl.
CPC ............ *A23L 17/60* (2016.08); *A23C 9/1544* (2013.01); *A23K 10/30* (2016.05); *A23L 33/105* (2016.08); *A23P 10/40* (2016.08); *A23V 2002/00* (2013.01)

(58) Field of Classification Search
CPC ....................................................... A23L 17/60
See application file for complete search history.

(56) References Cited

U.S. PATENT DOCUMENTS

| | | | |
|---|---|---|---|
| 7,604,821 B2 * | 10/2009 | Villani | ................ A61K 35/655 424/520 |
| 10,426,184 B1 * | 10/2019 | Sun | ........................ A23L 17/60 |
| 2008/0317790 A1 | 12/2008 | Trudsoe | |
| 2014/0303264 A1 * | 10/2014 | Tan | ........................ A61K 36/03 536/56 |

FOREIGN PATENT DOCUMENTS

| | | |
|---|---|---|
| CN | 1668647 A | 9/2005 |
| CN | 108354144 A | 8/2018 |
| FR | 2784549 B1 | 12/2000 |
| JP | 2011139694 A | 7/2011 |
| WO | 20101380041 W | 12/2010 |
| WO | 2013033598 W | 3/2013 |
| WO | 2015109362 W | 7/2015 |

OTHER PUBLICATIONS

The Use of Bulk Density Measurements as Flowability Indicators, Abdullah E. C., et al., Powder Technology, Elsevier Sequoia, Lausanne, Ch., vol. 102, No. 2, May 3, 1999, pp. 151-165 XP002272427.

* cited by examiner

*Primary Examiner* — Gina C Justice (57) ABSTRACT

The present invention provides a seaweed-based powder. The seaweed-based powder of the present invention has the advantage that it does not deleteriously impact, or it impacts to a lesser extent, the desired colour of a product containing thereof. In addition, the seaweed-based powder of the present invention has the capacity to produce gels having an optimum strength for the intended application. In particular, the invention provides a seaweed-based powder having an aerated bulk density (ABD) of at least 0.20 and a CIELAB L* value of at least 70.

19 Claims, 1 Drawing Sheet

SEAWEED FLOUR

CROSS-REFERENCE TO RELATED APPLICATIONS

This application is a U.S. national phase application under 35 U.S.C. 371 of International Application No. PCT/US2019/054997, filed Oct. 7, 2019, entitled SEAWEED FLOUR, which claims the benefit of European Application No. 18199778.4, filed Oct. 11, 2018, entitled Seaweed-Based Powder, and European Application No. 19199003.5, filed Sep. 23, 2019, entitled Seaweed Flour, which are hereby incorporated by reference in their entirety.

FIELD OF THE INVENTION

The present invention relates to a seaweed-based powder for use in food, beverages, nutritional products, dietary supplements, feed, personal care applications, pharmaceutical applications and industrial applications. The present invention also relates to a method for the manufacturing of the seaweed-based powder.

BACKGROUND OF THE INVENTION

It is believed that the amount of seaweed production in the world is in the order of 20,000,000 t/year. Recently, improved ways of cultivating and harvesting of seaweeds were developed not only to increase production but also to enable a more efficient growth control. EP 2230895, EP 3246292 and WO 2017/131510 disclose examples of a cultivating system of seaweeds. However, in spite of recent developments in cultivating and harvesting seaweeds it is believed that the seaweeds produced still lack the versatility to be effectively used in a large range of applications.

Seaweeds are plant-like organisms that generally live attached to rock or other hard substrata in marine environments. Seaweeds may be microscopic such as microalgae but also enormous such as giant kelp that grows in "forests" and tower like underwater woods from their holdfasts at the bottom of the sea. Most of the seaweed species are either green (more than 6500 species), brown (about 2000 species), or red (about 7000 species) kinds.

Since hundreds of years, people recognized that seaweeds are beneficial for human as well as animal health and recently, various studies demonstrated that seaweeds are effective as fat substitutes. As people become more aware of the relation between diet and health, the consumption of seaweeds has been and is increasingly gaining attention. Nowadays, many new food products based on seaweeds have been developed and marketed, offering enhanced health benefits and the potential to decrease the risk of diseases. In addition to the vast health benefits when consumed directly or after minor pre-processing as dietary supplements, the seaweeds have a range of natural functional properties such as nutritional, physicochemical and textural properties; and when used as ingredients to manufacture various products, seaweeds may transfer to these products their advantageous functional properties. Seaweeds also come in various colours, e.g. red, green and brown and are an excellent source of a large range of natural pigments which may imparts interesting properties to various products. For example, the pigments may impart interesting sensorial characteristics and beneficial health properties to food. The colour of the seaweed is typically dependent on seaweed's location and pigmentation. Seaweed pigments include chlorophyll and carotenoids such as carotenes (b-carotene), xanthophylls (fucoxanthin, violaxanthin, antheraxanthin, zeaxanthin, lutein, neoxanthin) and phycobiliproteins (typical for red seaweeds). Pigments are what determine the actual colour of the seaweed by absorbing light waves and reflecting the specific colour of the seaweed. For example, the green seaweed contains chlorophyll, a pigment which reflects green light; red seaweeds contain phycoerythrin and/or phycocyanin which reflect red light; brown seaweeds contain fucoxanthin which reflects brown light; etc.

However, in certain applications, the natural colour of seaweeds is undesirable. For example in a range of food applications such as dairy products, e.g. yoghurts, milk-based beverages and cheeses; bakery products, e.g. pastries, cakes, breads and biscuits; confectionary products, e.g. pies and cookies; but also personal care applications such as lotions, creams, shampoos and the like, the ingredients used therein should have a neutral colour, i.e. as white as possible, in order not to affect the final colour of a product containing thereof so that it would result in products that are no longer acceptable to the consumer.

Thus far, it has not been possible to successfully produce a flour from a seaweed, and in particular a red seaweed, which is practically colourless. The currently available seaweed flours have a yellow-to-brown colour. For this reason, seaweed flours produced by prior methods are unsuitable as an ingredient to high-quality products, in particular in sensorily sophisticated food, personal care or pharmaceutical products.

It is also desirable to provide products which were not chemically bleached. In recent years, chemical treatments and chemical additives have become suspect and it is desirable to avoid such treatments and additives wherever possible. Moreover, many countries prohibit the use of chemically bleached flours in particular in food products. It is therefore highly desirable that the seaweed flour should be produced with an all-natural process, without the use of bleaching chemicals, e.g. chlorine.

Therefore, there is clearly a need for seaweed-based ingredient having a neutral colour which does not affect, or affects to a lesser extent, the desired final colour of a product containing thereof. There is also a need for a non-chemically modified, seaweed-based ingredient having the above mentioned desirable neutral colour.

SUMMARY OF THE INVENTION

The present invention provides a seaweed-based powder. The seaweed-based powder of the present invention (hereinafter referred to as "the inventive powder") has the advantage that it does not deleteriously impact, or it impacts to a lesser extent, the desired colour of a product containing thereof. In addition, the seaweed-based powder of the present invention has the capacity to produce gels having an optimum strength for the intended application.

In particular, the invention provides a seaweed-based powder having an aerated bulk density (ABD) of at least 0.20 and a CIELAB L* value of at least 70.

The invention also provides a natural process of producing the inventive powder. The natural process of the invention (hereinafter the "inventive process") utilizes only natural thermal and mechanical treatments and harmless ingredients and does not use harsh chemicals such as alkaline bases, oxidizing or bleaching agents or alcohols. The only added products used are water and natural salts typically found in the sea and hence in the seaweed itself, e.g. KCl. An additional advantage of the inventive process may be that it may preserve the nutritious and health benefits of the seaweed largely unaltered.

The inventive powder is therefore a naturally processed powder, i.e. a powder obtained by a process free of chemical steps, i.e. steps wherein chemicals such as the ones mentioned above.

The inventors further observed that the inventive powder can be utilized in the manufacturing of various high-end products, in particular in products with sophisticated sensorial properties such as food products and personal care products. The inventors also observed that the inventive powder had a lesser impact on sensorial properties of products containing thereof, in particular on colour. The impact on taste, odour, mouthfeel, appearance and the like due to the use of the inventive powder may also be reduced. The inventive powder may also have the ability not only to imparts those products with excellent rheological properties and textures, but may also improve the health-related properties of said products.

For examples, in the case of food products, the utilization of the inventive powder may improve the resistance against different diseases (e.g. obesity, dyslipidaemia, hypertension, diabetes).

The inventors also observed that in accordance with the circumstances of utilization, the inventive powder may allow an optimum modulation, alteration and/or adaptation of the properties of products containing thereof, e.g. rheological properties, and may allow a designer of such products to reduce the number of ingredients in such products and hence simplify their recipes.

When used in food products for example, the inventive dispersion may positively influence not only the texture, flow, mouthfeel and/or ingestion of said products but it may also favourably impact the biological mechanisms of digestion and/or deliver desired physiological impacts.

When used in personal care products, the inventive dispersion may positively influence the appearance of the product and allow for an optimum transfer of active materials present in such products to hair, skin or other places in need of care. The same may be true for pharmaceutical products also.

Other advantages of the inventive dispersion will become apparent from the detailed description of the invention given hereunder.

DETAILED DESCRIPTION OF THE INVENTION

The invention relates to a seaweed-based powder. The type of seaweed may be selected from numerous types of seaweeds. In the present context by "seaweed" is understood a macroscopic, multicellular, marine algae which can grow in the wild or can be farmed. Wild seaweeds typically grow in the benthic region of the sea or ocean without cultivation or care from humans. Farmed seaweeds are typically cultivated on various supports like ropes, fabrics, nets, tube-nets, etc., which are typically placed below the surface of the sea or ocean. Seaweeds may also be farmed in pools, ponds, tanks or reactors containing seawater and placed on the shore or inland. The term "seaweed" includes members of the red, brown and green seaweeds. The seaweed in accordance with the invention is functionally and structurally different than seaweed extracts, i.e. polysaccharides extracted from the seaweed e.g. agar-agar, alginate, carrageenan and the like. Preferably, the seaweed is a non-extracted seaweed, i.e. a seaweed which was non utilized as input material in a process of manufacturing seaweed extracts. A non-extracted seaweed, contains polysaccharides in essentially their naturally occurring amounts, i.e. the amount of a certain polysaccharide present in the seaweed is at least 70%, more preferably at least 80%, even more preferably at least 90%, most preferably at least 95% of the naturally occurring amount of the respective polysaccharide irrespective of the method utilized to measure said amount.

Throughout this document, certain taxonomies of seaweeds' families, genera, etc. are used. The referred taxonomies are those typically used in the art of seaweed cultivation and harvesting and/or in the art of seaweed extracts. An explanation of the taxonomies of red seaweeds are for example given by C. W. Schneider and M. J. Wynne in Botanica Marina 50 (2007): 197-249; by G. W. Sanders and M. H. Hommersand in American Journal of Botany 91(10): 1494-1507, 2004; and by Athanasiadis, A. in Bocconea 16(1): 193-198.2003.—ISSN 11204060. An explanation of the taxonomies of green seaweeds is for example given by Naselli-Flores L and Barone R. (2009) Green Algae. In: Gene E. Likens, (Editor) Encyclopedia of Inland Waters. volume 1, pp. 166-173 Oxford: Elsevier. An explanation of the taxonomies of brown seaweeds is for example given by John D. Wehr in Freshwater Algae of North America—Ecology and Classification, Edition: 1, Chapter: 22, Publisher: Academic Press, Editors: John D. Wehr, Robert G. Sheath, pp. 757-773.

In one embodiment, the seaweed used in according to the invention is a green seaweed.

Preferably, the seaweed used in accordance with the invention is a red seaweed, i.e. a seaweed belonging to Rhodophyta phylum; or a brown seaweed, i.e. orders, families and genera in the class Phaeophycaeae. Red seaweeds have a characteristic red or purplish colour imparted by pigments present in the seaweed and called phycobilin, e.g. phycoerythrin.

More preferably, the seaweed is a red seaweed selected from the families of Gigartinaceae, Bangiophyceae, Palmariaceae, Hypneaceae, Cystocloniaceae, Solieriaceae, Phyllophoraceae and Furcellariaceae or combinations thereof. Most preferably, the seaweed is selected from the genera of *Bangiales, Chondrus, Iridaea, Palmaria, Gigartina, Gracilaria, Gelidium, Rhodoglossum, Hypnea, Eucheuma, Kappaphycus, Agarchiella, Gymnogongrus, Sarcothalia, Phyllophora, Ahnfeltia, Mazzaella, Mastocarpus, Chondracanthus, Furcellaria* and mixtures thereof.

Best results were obtained when the seaweed was chosen from the group of seaweeds consisting of *Porphyra* sp., *Palmaria palmata, Eucheuma spinosum, Eucheuma denticulatum, Eucheuma* sp., *Eucheuma cottonii* (also known as *Kappaphycus alvarezii*), *Kappaphycus striatus, Kappaphycus* sp., *Chondrus crispus*, Irish moss, *Fucus crispus, Chondrus* sp, *Sarcothalia crispata, Mazzaella laminaroides, Mazzaella* sp., *Chondracanthus acicularis, Chondracanthus chamissoi, Chondracanthus* sp., *Gigartina pistilla, Gigartina mammillosa, Gigartina skottsbergii, Gigartina* sp., *Gracilaria* sp, *Gelidium* sp., *Mastocarpus stellatus* and mixtures thereof.

It is known that some of the red seaweeds, e.g. *Kappaphycus alvarezii*, may have green or brown strains; however, within the context of the present invention when mentioning for example that the seaweed is a red seaweed, it is herein meant the phylum and not the colour of the strains.

Most preferred brown seaweeds are those chosen from the families *Acsophyllum, Durvillaea, Ecklonia, Hyperborea, Laminaria, Lessonia, Macrocystis, Fucus* and *Sargassum*. Specific examples of brown seaweeds include Bull Kelp (*Durvillae potatorum*), *Durvillae* species, *D. antarctica* and Knotted Kelp (*Ascophyllum nosodum*).

The inventors observed that inventive powders obtained from green (i.e. the seaweeds belonging to the groups Chlorophyta and Charophyta) and brown seaweeds, were mostly advantageous in the manufacturing of feed or industrial products.

The ABD in accordance with the invention is measured in g/ml. The inventive powder has an ABD of at least 0.20. The inventors surprisingly observed that the ABD of the inventive powder beneficially contributed to achieving the advantages of the present invention. Preferably, the ABD of the inventive powder is at least 0.25, more preferably at least 0.30, even more preferably at least 0.35, most preferably at least 0.40. The ABD is preferably at most 0.98, more preferably at most 0.95, most preferably at most 0.90. Preferably, said ABD is between 0.20 and 0.98.

Preferably, the CIELAB L* value of the inventive powder is at least 72, more preferably at least 74, even more preferably at least 76, yet more preferably at least 78, yet more preferably at least 80, most preferably at least 82.

Preferably, the inventive powder has a CIELAB a* value of at most 5.0, more preferably at most 3.5, most preferably at most 2.0. Preferably, the inventive powder has a CIELAB b* value of at most 20, more preferably at most 17, most preferably at most 15.

Preferably, the a* of the inventive powder is between 0.5 and 5.0, more preferably between 1.0 and 3.5, most preferably between 1.5 and 2.0.

Preferably, the b* of the inventive powder is between 1 and 20, more preferably between 5 and 17, most preferably between 10 and 15.

Preferably, the ABD of the inventive powder is at least 0.25 and the CIELAB L* value is at least 72, more preferably at least 74, even more preferably at least 76, yet more preferably at least 78, yet more preferably at least 80, most preferably at least 82. More preferably, the ABD of the inventive powder is at least 0.30 and the CIELAB L* value is at least 72, more preferably at least 74, even more preferably at least 76, yet more preferably at least 78, yet more preferably at least 80, most preferably at least 82. Even more preferably, the ABD of the inventive powder is at least 0.35 and the CIELAB L* value is at least 72, more preferably at least 74, even more preferably at least 76, yet more preferably at least 78, yet more preferably at least 80, most preferably at least 82. Most preferably, the ABD of the inventive powder is at least 0.40 and the CIELAB L* value is at least 72, more preferably at least 74, even more preferably at least 76, yet more preferably at least 78, yet more preferably at least 80, most preferably at least 82.

The inventive powder may have an excellent capacity of producing gels. Said powder preferably has a storage modulus (G') of at least 10 Pa as determined on a 0.3 wt % aqueous dispersion of said powder, more preferably at least 30 Pa, most preferably at least 50 Pa. Preferably said powder has a critical gelling concentration ($C_0$) of at most 0.5 wt %, more preferably at most 0.3 wt %, most preferably at most 0.1 wt %.

Preferably, the inventive powder has an ABD of at least 0.25, a CIELAB L* value of at least 72 and a storage modulus (G') of at least 10 Pa. Preferably, the inventive powder also has a critical gelling concentration ($C_0$) of at most 0.5 wt %. Preferably, the ABD is at least 0.30, more preferably at least 0.35, most preferably at least 0.40.

The inventive powder or the seaweed used to manufacture thereof is a non-chemically bleached (or non-chemically whitened) powder, i.e. a powder essentially free of oxidizing or bleaching agents. Bleaching agents are materials that lighten or whiten a substrate through chemical reactions which typically involve oxidative or reduction processes that degrade colour. In particular, the inventive powder is essentially free of any chlorine and its related compounds, e.g. hypochlorites, N-chloro compounds, chlorine dioxide and the like; but also preferably essentially free of peroxygen bleaching agents, e.g. hydrogen peroxide, sodium perborate and the like; and also preferably essentially free of any ozonide class agents such as those described in U.S. Pat. No. 1,483,546 or 1,565,375. It is herein understood that the above compounds include their equivalent acids if available.

Preferably, the inventive powder is also essentially free of any whitening pigment, i.e. any compound which provides a whitening effect by scattering light or any other physical phenomenon. Examples of such whitening pigments include titanium dioxide and the like.

By essentially free is herein understood that the inventive powder contains those compounds in a quantity insufficient to achieve any bleaching or whitening effect, most preferably, said powder is completely free of such compounds.

Preferably, the inventive powder has an ABD of at least 0.25, a CIELAB L* value is at least 72, more preferably at least 74, even more preferably at least 76, yet more preferably at least 78, yet more preferably at least 80, most preferably at least 82 and the seaweed is chosen from the group of seaweeds consisting of *Porphyra* sp., *Palmaria palmata, Eucheuma spinosum, Eucheuma denticulatum, Eucheuma* sp., *Eucheuma cottonii* (also known as *Kappaphycus alvarezii*), *Kappaphycus striatus, Kappaphycus* sp., *Chondrus crispus*, Irish moss, *Fucus crispus, Chondrus* sp, *Sarcothalia crispata, Mazzaella laminaroides, Mazzaella* sp., *Chondracanthus acicularis, Chondracanthus chamissoi, Chondracanthus* sp., *Gigartina pistilla, Gigartina mammillosa, Gigartina skottsbergii, Gigartina* sp., *Gracilaria* sp, *Gelidium* sp., *Mastocarpus stellatus* and mixtures thereof. Said powder preferably has a storage modulus (G') of at least 10 Pa as determined on a 0.3 wt % aqueous dispersion of said powder, more preferably at least 30 Pa, most preferably at least 50 Pa. Preferably said powder has a critical gelling concentration ($C_0$) of at most 0.5 wt %, more preferably at most 0.3 wt %, most preferably at most 0.1 wt %.

More preferably, the seaweed is chosen from the group of seaweeds consisting of *Porphyra* sp., *Palmaria palmata, Eucheuma spinosum, Eucheuma denticulatum, Eucheuma* sp., *Eucheuma cottonii* (also known as *Kappaphycus alvarezii*), *Kappaphycus striatus, Kappaphycus* sp., *Chondrus crispus*, Irish moss, *Fucus crispus, Chondrus* sp, *Sarcothalia crispata, Mazzaella laminaroides, Mazzaella* sp., *Chondracanthus acicularis, Chondracanthus chamissoi, Chondracanthus* sp., *Gigartina pistilla, Gigartina mammillosa, Gigartina skottsbergii, Gigartina* sp., *Gracilaria* sp, *Gelidium* sp., *Mastocarpus stellatus* and mixtures thereof; the ABD is at least 0.30 and the CIELAB L* value is at least 72, more preferably at least 74, even more preferably at least 76, yet more preferably at least 78, yet more preferably at least 80, most preferably at least 82.

Even more preferably, the seaweed is chosen from the group of seaweeds consisting of *Porphyra* sp., *Palmaria palmata, Eucheuma spinosum, Eucheuma denticulatum, Eucheuma* sp., *Eucheuma cottonii* (also known as *Kappaphycus alvarezii*), *Kappaphycus striatus, Kappaphycus* sp.,

*Chondrus crispus*, Irish moss, *Fucus crispus, Chondrus* sp, *Sarcothalia crispata, Mazzaella laminaroides, Mazzaella* sp., *Chondracanthus acicularis, Chondracanthus chamissoi, Chondracanthus* sp., *Gigartina pistilla, Gigartina mammillosa, Gigartina skottsbergii, Gigartina* sp., *Gracilaria* sp, *Gelidium* sp., *Mastocarpus stellatus* and mixtures thereof; the ABD is at least 0.40 and the CIELAB L* value is at least 72, more preferably at least 74, even more preferably at least 76, yet more preferably at least 78, yet more preferably at least 80, most preferably at least 82.

By seaweed-based powder is herein understood a collection of seaweed particles, i.e. said powder contains seaweed particles. Said particles may be obtained by processing the seaweed in accordance with the method of the invention. Preferably, the seaweed particles have a D50 of preferably at least 20 µm, more preferably at least 50 µm, even more preferably at least 75 µm, even more preferably at least 85 µm, most preferably at least 120 µm. Preferably, said D50 is at most 750 µm, more preferably at most 500 µm, even more preferably at most 350 µm, most preferably at most 250 µm. Preferably, said D50 is between 20 µm and 750 µm, more preferably between 50 µm and 350 µm, most preferably between 75 µm and 250 µm.

The invention also relates to a seaweed powder comprising seaweed particles having a D50 between 20 and 250 µm. Examples of a seaweed suitable to produce said powder are given hereinabove and will not be repeated herein. Preferably, said seaweed powder has ABD and L*, a* and b* values, as well as D90, $C_0$ and G' values as indicated hereinabove.

Preferably, the seaweed particles forming the inventive powder have a D90 of preferably at least 125 µm, more preferably at least 100 µm, even more preferably at least 175 µm, most preferably at least 220 µm. Preferably, said D90 is at most 800 µm, more preferably at most 600 µm, most preferably at most 400 µm. Preferably, said D90 is between 125 µm and 800 µm, more preferably between 175 µm and 600 µm, most preferably between 220 µm and 400 µm.

Preferably, the seaweed particles have a D50 of at least 20 µm and a D90 of at least 125 µm, more preferably a D50 of at least 50 µm and a D90 of at least 175 µm, most preferably a D50 of at least 75 µm and a D90 of at least 220 µm.

Preferably, the inventive powder is a dry powder. By dry powder is herein understood a powder having a moisture content of at most 25 wt % based on the total weight of the powder. Preferably, the moisture content is at least 4 wt %, more preferably at least 6 wt %, even more preferably at least 8 wt %, most preferably at least 10 wt %. Preferably, said moisture content is at most 20 wt %, more preferably at most 15 wt %, most preferably at most 12 wt %. Preferably, said moisture content is between 4 wt % and 20 wt %, more preferably between 6 wt % and 15 wt %, most preferably between 8 wt % and 12 wt %. It was observed that a too dry powder in accordance with the invention may be costly to produce, while a too wet powder may have a slightly reduced shelf life.

Preferably, the seaweed-based powder of the invention contains at least 80% dry basis of seaweed particles, more preferably at least 90% dry basis, even more preferably at least 92% dry basis, most preferably at least 96% wt % dry basis. The remaining wt % up to 100 wt % may contain foreign materials other than the seaweed particles. Examples of foreign materials include impurities and/or unwanted minerals (i.e. minerals harmful to human or animal health) typically remaining between the seaweed particles after the processing of the seaweed. It is desirable that the presence of foreign materials is minimized, e.g. by carefully cleaning and processing the seaweed into the inventive powder.

The inventors observed that the inventive powder has functional properties when dispersed in an aqueous media, i.e. said powder helps in adjusting the rheological properties and stabilizing the products containing thereof to levels that couldn't have been achieved hitherto by existing seaweed flours. Preferably, the inventive powder has a G' of at least 70 Pa, more preferably at least 90 Pa, even more preferably at least 110 Pa, most preferably at least 120 Pa. Preferably, said G' is at most 500 Pa, more preferably at most 400 Pa, even more preferably at most 300 Pa, most preferably at most 200 Pa.

The functionality of the inventive powder can be varied within wide ranges depending on the type of seaweed used as the raw material in the production of said powder. For example, inventive powders having a G' value at least 50 Pa can be obtained from *Spinosum*, while higher G' of at least 120 Pa and even at least 180 Pa, can be obtained from *Chondrus* or *Cottonii*, respectively.

The storage modulus G' is commonly used to analyse the rheological properties of products, most often said products being used to make dispersions. G' is a measure of a deformation energy stored in the dispersion during the application of shear forces and provides an excellent indication of the capability of said product to influence dispersion's viscoelastic behaviour. For the purpose of the invention, G' was measured on an aqueous medium containing a reduced amount of 0.3 wt % of inventive powder relative to the total weight of the aqueous medium. It is highly desirable to achieve dispersions having G' values as high as possible at powder concentrations as low as possible.

By "aqueous dispersion" containing the inventive powder is herein understood a composition wherein said powder is dispersed in the aqueous medium, said aqueous medium preferably forming a continuous phase. Preferably, said powder is homogeneously dispersed in said medium. The powder may be dispersed inside the aqueous medium (i.e. in the bulk) but can also be present at any interface present in said aqueous medium, e.g. the interface between water and any component other than the powder, e.g. oil. Examples of dispersions include without limitation suspensions, emulsions, solutions and the like.

The term "aqueous medium" as used herein means a liquid medium which contains water, non-limiting example thereof including pure water, a water solution and a water suspension, but also aqueous liquid mediums such as those contained by dairy products, e.g. reconstituted skimmed milk, milk, yoghurt and the like; by personal care products such as lotions, creams, ointments and the like; and pharmaceutical products. Within the context of the present invention, most preferred aqueous medium for the determination of the G' is reconstituted skimmed milk and therefore the G' was measured on a solution of reconstituted skimmed milk containing 0.3 wt % of inventive powder relative to the total weight of the solution.

The inventors observed that, due to its optimum rheological properties, when adding the inventive powder to food products and in particular to dairy products, the manufacturing of products having excellent textures is facilitated, obtaining e.g. smooth and/or shiny textures; excellent mouthfeel, e.g. creamy and/or thick mouthfeel. Moreover, due to its excellent functional properties, the inventive powder may facilitate the production of spoonable, semi-gelled or gelled products. When varying the amount of the inventive powder in products, the texture thereof may be adjusted to have the desired consistency, balance and character, therefore allowing the manufacturing of products with optimum appearances, textures and mouthfeel. Such advantageous properties were to inventors' knowledge never achieved hitherto in products utilizing seaweed-based ingredients. The inventive powder may also have the necessary functionality needed to adjust and/or increase the viscosity, cohesiveness and firmness of products containing thereof but also to stabilize proteins and particulate matter inside said products.

Preferably, the ABD of the inventive powder is at least 0.25, the storage modulus (G') is at least 10 Pa as determined on a 0.3 wt % aqueous dispersion of said powder and the CIELAB L* value is at least 72, more preferably at least 74, even more preferably at least 76, yet more preferably at least 78, yet more preferably at least 80, most preferably at least 82. More preferably, the ABD of the inventive powder is at least 0.30, the storage modulus (G') is at least 10 Pa and the CIELAB L* value is at least 72, more preferably at least 74, even more preferably at least 76, yet more preferably at least 78, yet more preferably at least 80, most preferably at least 82. Even more preferably, the ABD of the inventive powder is at least 0.35, the storage modulus (G') is at least 10 Pa and the CIELAB L* value is at least 72, more preferably at least 74, even more preferably at least 76, yet more preferably at least 78, yet more preferably at least 80, most preferably at least 82. Most preferably, the ABD of the inventive powder is at least 0.40, the storage modulus (G') is at least 10 Pa and the CIELAB L* value is at least 72, more preferably at least 74, even more preferably at least 76, yet more preferably at least 78, yet more preferably at least 80, most preferably at least 82. Said powder preferably has a storage modulus (G') of at least 30 Pa, most preferably at least 50 Pa. Preferably said powder has a critical gelling concentration ($C_0$) of at most 0.5 wt %, more preferably at most 0.3 wt %, most preferably at most 0.1 wt %. The seaweed utilized in manufacturing said powder is preferably a non-extracted seaweed. Preferably, the seaweed is chosen from the group of seaweeds consisting of *Porphyra* sp., *Palmaria palmata*, *Eucheuma spinosum*, *Eucheuma denticulatum*, *Eucheuma* sp., *Eucheuma cottonii* (also known as *Kappaphycus alvarezii*), *Kappaphycus striatus*, *Kappaphycus* sp., *Chondrus crispus*, Irish moss, *Fucus crispus*, *Chondrus* sp, *Sarcothalia crispata*, *Mazzaella laminaroides*, *Mazzaella* sp., *Chondracanthus acicularis*, *Chondracanthus chamissoi*, *Chondracanthus* sp., *Gigartina pistilla*, *Gigartina mammillosa*, *Gigartina skottsbergii*, *Gigartina* sp., *Gracilaria* sp, *Gelidium* sp., *Mastocarpus stellatus* and mixtures thereof. Said powder is preferably non-chemically bleached. Preferably, said powder is also essentially free of any whitening pigment.

Preferably, the ABD of the inventive powder is at least 0.25, the critical gelling concentration ($C_0$) is at most 0.5 wt % and the CIELAB L* value is at least 72, more preferably at least 74, even more preferably at least 76, yet more preferably at least 78, yet more preferably at least 80, most preferably at least 82. More preferably, the ABD of the inventive powder is at least 0.30, the critical gelling concentration ($C_0$) is at most 0.5 wt % and the CIELAB L* value is at least 72, more preferably at least 74, even more preferably at least 76, yet more preferably at least 78, yet more preferably at least 80, most preferably at least 82. Even more preferably, the ABD of the inventive powder is at least 0.35, the critical gelling concentration ($C_0$) is at most 0.5 wt % and the CIELAB L* value is at least 72, more preferably at least 74, even more preferably at least 76, yet more preferably at least 78, yet more preferably at least 80, most preferably at least 82. Most preferably, the ABD of the inventive powder is at least 0.40, the critical gelling concentration ($C_0$) is at most 0.5 wt % and the CIELAB L* value is at least 72, more preferably at least 74, even more preferably at least 78, yet more preferably at least 80, most preferably at least 82. Said powder preferably has a storage modulus (G') of at least 10 Pa, more preferably at least 30 Pa, most preferably at least 50 Pa. Preferably said powder has a critical gelling concentration ($C_0$) of at most 0.3 wt %, most preferably at most 0.1 wt %. The seaweed utilized in manufacturing said powder is preferably a non-extracted seaweed. Preferably, the seaweed is chosen from the group of seaweeds consisting of *Porphyra* sp., *Palmaria palmata*, *Eucheuma spinosum*, *Eucheuma denticulatum*, *Eucheuma* sp., *Eucheuma cottonii* (also known as *Kappaphycus alvarezii*), *Kappaphycus striatus*, *Kappaphycus* sp., *Chondrus crispus*, Irish moss, *Fucus crispus*, *Chondrus* sp, *Sarcothalia crispata*, *Mazzaella laminaroides*, *Mazzaella* sp., *Chondracanthus acicularis*, *Chondracanthus chamissoi*, *Chondracanthus* sp., *Gigartina pistilla*, *Gigartina mammillosa*, *Gigartina skottsbergii*, *Gigartina* sp., *Gracilaria* sp, *Gelidium* sp., *Mastocarpus stellatus* and mixtures thereof. Said powder is preferably non-chemically bleached. Preferably, said powder is also essentially free of any whitening pigment.

A large variety of products and in particular food products can benefit from the advantageous properties of the inventive powder, non-limiting examples of food products including chilled or ambient stable desserts with gelled, aerated or creamy texture, e.g. flan, crème dessert, crème caramel, pudding, egg based-desserts, custard, Vla, mousses, whipped cream, aerated toppings, multi-layered desserts; coffee creamers; beverages and in particular dairy drinks e.g. flavoured milks and drinkable yoghurts, cocoa milks; creams and in particular dairy creams; and frozen desserts, these food products can be based on dairy or vegetable fat/protein sources.

Another indicator of the improved functionality of the inventive powder is its reduced critical gelling concentration ($C_0$), i.e. a $C_0$ below 0.1 wt %. $C_0$ represents the lowest concentration of the inventive powder in an aqueous medium below which no gel-like behaviour can be observed. $C_0$ is also referred to as the critical concentration of gelation and is measured according to the methodology presented in the METHODS OF MEASUREMENT section of the description.

The inventive powder has therefore a $C_0$ of preferably at least 0.001 wt %, more preferably at least 0.005 wt %, even more preferably at least 0.010 wt %, most preferably at least 0.015 wt %. Preferably, said $C_0$ is at most 0.500 wt %, more preferably at most 0.300 wt %, more preferably at most 0.100 wt %, more preferably at most 0.095 wt %, more preferably at most 0.090 wt %, even more preferably at most 0.085 wt %, most preferably at most 0.080 wt %. Preferably, the $C_0$ is between 0.001 and 0.500 wt %, more preferably between 0.001 and 0.100 wt %, more preferably between 0.005 and 0.090 wt %, most preferably between 0.010 and 0.080 wt %.

The present inventors noticed that the inventive powder has a combination of G' and $C_0$, in particular a high G' and a low $C_0$, that was never achieved hitherto for any seaweed-based powder or flour. In particular, the inventive powder may be used at lower concentrations to achieve increased G' values, providing the food, feed and other product manufacturers with increased design freedom for their respective formulations, in that they may be able to add or remove constituents while maintaining optimum viscoelastic properties thereof.

The inventors also observed that the inventive powder is able to adjust the rheological properties of products containing thereof up to a desired consistency, behaviour, texture, stability. This ability is particularly important during said products' transportation when the products may be subjected to shocks and high gravity forces (G-forces) which in turn may cause the various ingredients within said product to separate and even ooze out therefrom. This ability is also particularly important during storage and in particular long term storage since again ingredients' separation and/or leakage may occur. Such unwanted effects may deleteriously influence the texture, rheology and visual appearance of the products and is hence highly undesired.

The inventive powder also has reduced odour and is largely tasteless. These are excellent attributes when a "neutral" ingredient is needed for the manufacturing of products with certain textures, mouthfeel, appearance and the like.\

Another benefit of the inventive powder is the presence of dietary fibers in the seaweed forming the particles thereof and in particular the presence of soluble and insoluble dietary fibers. Fibers come in two forms, soluble and insoluble, which are characterized by both their physical characteristics and their physiological effects. Soluble fibers are soluble in water and comprises constituents such as gums, being considered to provide added health benefits, e.g. coating the lining of the digestive track, delaying the emptying of stomach constituents and slowing the rate of sugar absorption. In contrast, insoluble fibers are comprised of substances like cellulose and hemicelluloses like glucomannan and glucans and are the indigestible portion. Such fibers add bulk and may improve the movement of food through the digestive track.

The inventive powder preferably comprises at least 1 wt % of a dietary fibre component based on the powder's total weight, more preferably at least 5 wt %, most preferably at least 10 wt %. Preferably, the fibre content is at most 90 wt %. The dietary fibre content can be adjusted for example by choosing a specific seaweed having the desired dietary fibre content and/or utilizing blends of seaweeds to achieve thereof.

The invention therefore relates to a seaweed powder comprising comprises at least 1 wt % of a dietary fibre component based on the powder's total weight, more preferably at least 5 wt %, most preferably at least 10 wt %. Examples of seaweed suitable to produce said powder are given hereinabove and will not be repeated herein. Preferably, said seaweed powder has ABD and L*, a* and b* values, as well as D50, D90, $C_0$ and G' values as indicated hereinabove.

Another benefit of the inventive powder is the presence of proteins in the seaweed forming the particles thereof. Preferably, the inventive powder contains at least 0.1 wt % of a protein component based on the powder's total weight, more preferably at least 0.5 wt %, most preferably at least 1.0 wt %. Preferably, the protein content is at most 70 wt %, more preferably at most 60 wt %, most preferably at most 50 wt %. The protein content can be adjusted for example by choosing a specific seaweed having the desired protein content and/or utilizing blends of seaweed to achieve thereof.

Depending on the type of seaweed used to manufacture the inventive powder, said powder may naturally contain (i.e. without addition) beneficial nutrients other than proteins and dietary fibers, e.g. colouring substances like (3-carotene, vitamins, free fatty acids, amino acids, minerals, antioxidants like polyphenols, phytosterols etc.

Preferably, the inventive powder is gluten free. More preferably, the inventive powder is wheat-, grain-, nut- and gluten-free. Preferably, the inventive powder is a non-chemically modified powder.

Preferably, the inventive powder has a content of at most 20 wt % relative to the weight of the powder, more preferably at most 15 wt %, even more preferably at most 10 wt %, most preferably at most 5 wt %. Preferably, said content is at least 0.01 wt %, more preferably at least 0.1 wt %, most preferably at least 1 wt %. It was observed that when the inventive powder has a content within the preferred ranges, it's functionality was improved.

Preferably, the inventive powder contains an amount of acid insoluble material (AIM) of at most 50 wt % relative to the weight of the powder, more preferably at most 40 wt %, even more preferably at most 30 wt %, most preferably at most 20 wt %. Preferably, said AIM content is at least 1 wt %, more preferably at least 5 wt %, most preferably at least 10 wt %. It was observed that when the inventive powder has an AIM content within the preferred ranges, it's nutritional properties were optimized.

Preferably, the inventive powder contains an amount of acid insoluble ashes (AIA) of at most 5.0 wt % relative to the weight of the powder, more preferably at most 3.0 wt %, even more preferably at most 1.0 wt %, most preferably at most 0.80 wt %. Preferably, said AIA content is at least 0.01 wt %, more preferably at least 0.05 wt %, most preferably at least 0.10 wt %. It was observed that an inventive powder having an AIA content within the preferred ranges, is more suitable for use in food, personal care and pharmaceutical products as it does not introduce, or introduce to a lesser extent, foreign materials into said products, which in turn may require additional purification steps of said products.

The inventors also surprisingly observed that the inventive powder has properties that allow products containing thereof to maintain optimum palatability. Palatability includes factors such as taste, flavour and colour. The known seaweed-based flours have a seawater-like taste and odour and a dark brownish colour, which makes them unsuitable for utilisation in products which require neutral ingredients, e.g. dairy products. The inventors observed that the inventive powder does not have such drawbacks or has them to a lesser extent than the known flours. Such advantageous properties were to inventors' knowledge never provided hitherto by any seaweed-based powder or flour.

The invention also provides a composition comprising the inventive powder and an additional compound, said compound being in a powdery or non-powdery form. The additional compound can be chosen from the group consisting of additives; preservatives; vitamins; sterols like phytosterols; antioxidants like polyphenols; beneficial minerals for human nutrition; whole vegetable extracts; hydrocolloids or gums like glucomannans, galactomannans, cellulose (microfibrillated cellulose, cellulose gel), alginate, carrageenan ulvan, laminarin and other 1,3 beta-glucans; starch; dextrins; sugars like sucrose, glucose; polyols like mannitol, erythritol, glycerol, sorbitol, xylitol, maltitol; protein or protein hydrolysate like plants or vegetables proteins and dairy proteins; oils and fat; surfactants; powdered lecithin and combinations thereof. The amount of the additional compound can vary widely depending on the application of the composition, for most applications said amount being typically between 0.01 wt % and 99 wt % based on the total weight of the composition.

The invention also provides a composition comprising the inventive powder and a gum, wherein the gum is preferably chosen from the group consisting of guar gum, xanthan gum, locust bean gum, cassia gum, tara gum, konjac gum, alginate, agar, carrageenan, beta 1,3 glucans, starch and combinations thereof. Preferably, the gum is used in an amount of at least 5 wt % based on the total weight of the composition, more preferably at least 20 wt %, even more preferably at least 30 wt %, most preferably at least 50 wt %. Preferably, the gum amount is at most 90 wt %, more preferably at most 70 wt %, even more preferably at most 50 wt %, most preferably at most 20 wt %.

The invention also provides a composition comprising the inventive powder and a starch. Preferably, the starch is used in an amount of at least 5 wt % based on the total weight of the composition, more preferably at least 20 wt %, even more preferably at least 30 wt %, most preferably at least 50 wt %. Preferably, the starch amount is at most 90 wt %, more preferably at most 70 wt %, even more preferably at most 50 wt %, most preferably at most 30 wt %. The starch used in this invention may be any starch derived from any native source. A native starch as used herein, is one as it is found in nature. Also suitable are starches derived from a plant obtained by any known breeding techniques. Typical sources for the starches are cereals, tubers and holdfasts, legumes and fruits. The native source can be any variety, including without limitation, corn, potato, sweet potato, barley, wheat, rice, sago, amaranth, tapioca (cassava), arrow-holdfast, canna, pea, banana, oat, rye, triticale, and sorghum, as well as low amylose (waxy) and high amylose varieties thereof. Low amylose or waxy varieties is intended to mean a starch containing at most 10% amylose by weight, preferably at most 5%, more preferably at most 2% and most preferably at most 1% amylose by weight of the starch. High amylose varieties is intended to mean a starch which contains at least 30% amylose, preferably at least 50% amylose, more preferably at least 70% amylose, even more preferably at least 80% amylose, and most preferably at least 90% amylose, all by weight of the starch. The starch may be physically treated by any method known in the art to mechanically alter the starch, such as by shearing or by changing the granular or crystalline nature of the starch, and as used herein is intended to include conversion and pregelatinization. Methods of physical treatment known in the art include ball-milling, homogenization, high shear blending, high shear cooking such as jet cooking or in a homogenizer, drum drying, spray-drying, spray cooking, chilsonation, roll-milling and extrusion, and thermal treatments of low (e.g. at most 2 wt %) and high (above 2 wt %) moisture containing starch. The starch may be also chemically modified by treatment with any reagent or combination of reagents known in the art. Chemical modifications are intended to include crosslinking, acetylation, organic esterification, organic etherification, hydroxyalkylation (including hydroxypropylation and hydroxyethylation), phosphorylation, inorganic esterification, ionic (cationic, anionic, nonionic, and zwitterionic) modification, succination and substituted succination of polysaccharides. Also included are oxidation and bleaching. Such modifications are known in the art, for example in Modified starches: Properties and Uses. Ed. Wurzburg, CRC Press, Inc., Florida (1986).

The inventors observed that the compositions in accordance with the invention may be useful in positively influencing mixing, sheeting, extrusion, baking, frying, and roasting characteristics of human and animal food; in advantageously modifying the rheology of sauces, dips, beverages, soups and other liquid, semi-liquid and/or semi-solid products; in providing products with interesting textures, good appearance and the like.

The present invention also relates to a dietary composition comprising the inventive powder and a therapeutic agent such as an absorption altering agent, an appetite altering agent, a metabolism altering agent, a cholesterol altering agent or any combination thereof. Examples of such agents are given in WO 2016/085322, the disclosure thereof being incorporated herein by reference.

The present invention also relates to a pharmaceutical composition comprising the inventive powder and a pharmaceutically acceptable carrier and/or an excipient and/or a diluent. The excipient/diluent/carrier(s) must be "acceptable" in the sense of being compatible with the therapeutic agent and not deleterious to the recipients thereof.

The present invention relates further to a method (the "inventive method") of producing a seaweed-based powder, in particular the inventive powder, comprising the steps of:
  a) Providing a biomass containing seaweed and water, and having a dry solids (DS) content of at least 5 wt %.
  b) Subjecting the biomass to an exudation process to exude the water present inside the seaweed and obtaining an exudated biomass containing an exudated seaweed;
  c) Optionally drying the exudated biomass to a moisture level of at most 40 wt % to obtain a dried, exudated biomass;
  d) Cooking the exudated biomass in a brine solution to obtain a cooked biomass;
  e) Optionally washing and/or drying the cooked biomass; and
  f) Transforming the cooked biomass of step d) or e) into a powder containing seaweed particles, said powder having an ABD of at least 0.2 and a CIELAB L* value of at least 70.

As used herein, the term "dry solids" (DS) is the difference between the total weight of a sample containing solids and the weight of the moisture or water content in the sample.

It is preferred that the inventive method uses live seaweed largely unaffected by decomposition and/or fermentation. It is therefore highly desirable that the inventive method does not involve fermentation of the seaweed, i.e. it is a non-fermentative method.

In step a) of the inventive method, all parts of the seaweed can be used, e.g. holdfasts, stem and leaves, for making the biomass. The seaweed can be used whole, cut or otherwise mechanically manipulated. Advantageously, the seaweed is used as harvested, without further mechanical manipulation. Advantageously, the seaweed is harvested by cutting, and leaving the holdfasts intact, allowing for subsequent regrowth. Another advantage of such harvesting is that it guarantees a minimum or even no presence of foreign materials, in particular impurities such as sand, stones and the like in the seaweed. Lastly, such method allows the regeneration of the ecosystem (e.g. on the sea floor) and is therefore environmentally sustainable. Ideally, the seaweed is cultivated. Preferably, at step a) of the inventive method, the utilized seaweed is a live and fresh seaweed.

The water content of the biomass includes water that may be present inside the seaweed (internal seaweed water or water of hydration); water that may have been added onto the seaweed (e.g. during cleaning thereof); and/or water that may have remained on the seaweed during its harvesting. If the seaweed as harvested does not contain the necessary amount of water to provide the required biomass, additional fresh water or seawater may be added, preferably seawater is used, most preferably seawater from the location of the harvest is used.

Preferably, the seaweed is cleaned to remove extraneous material, e.g. impurities such as stones, sand, shells, plastics, fish, crabs and other impurities that can contaminate the seaweed before or after harvest. The cleaning can be carried out by washing with fresh water or seawater, or any other cleaning method typically used for said purpose. Preferably, the cleaning is carried out with seawater from the location of harvest to preserve the seaweed. To remove eventual metallic impurities, the seaweed can pass in front of a magnet.

Preferably at step a), the biomass contains fresh seaweed and water, wherein the amount of non-internal water is at least 5 wt % relative to the total weight of the biomass, more preferably at least 45 wt %, most preferably at least 85 wt % water.

Preferably, at step a) the biomass contains a cleaned seaweed and has a DS of at least 15 wt %, more preferably at least 30 wt %, most preferably at least 55 wt %. Preferably, the DS is at most 95 wt %, more preferably at most 85 wt %, most preferably at most 80 wt %. Preferably, said DS is between 5 and 95 wt %, more preferably between 30 and 85 wt %, most preferably between 55 and 80 wt %.

Preferably, at step a) the biomass has a temperature of at least 5° C., more preferably at least 10° C., most preferably at least 20° C. Preferably, said temperature is at most 40° C., more preferably at most 35° C., most preferably at most 30° C. Preferably, said temperature is between 5 and 40° C., more preferably between 10 and 35° C., most preferably between 20 and 30° C. The biomass is preferably kept at a temperature to ensure that in bulk, the biomass has a temperature within the above mentioned ranges.

It is desirable not to subject the seaweed to any chemical treatments that may degrade the seaweed, e.g. acid or alkali treatment or bleaching reagents. It is also desirable to maintain the seaweed in conditions that are ideal for the exudation process of step b) of the inventive method, such as conditions which do not expedite the desiccation of the seaweed. Ideal conditions include storing the seaweed in shaded areas, in which the seaweed is piled together.

It is essential to carry out step b) of the inventive method on a biomass containing a seaweed capable of exuding. The process at step b) aims to exude in a carefully controlled environment the water present inside the seaweed (the water internal to the seaweed also known as the water of hydration of the seaweed), i.e. inside the holdfasts, stems and leaves thereof.

Preferably, step b) utilizes a live biomass, i.e. a biomass which was not dried between the harvest of the seaweed and the commencing of the exudation step. By "live, harvested" seaweed is herein understood a seaweed that is kept alive after harvest, has biological activity such as respiration and has the ability to exude. In clear distinction to live, harvested seaweed, dried seaweed is dead, has no biological activity such as respiration and is no longer capable of exudation. A dead seaweed may be rehydrated with water to some extent and in this case may be able to exude some of that water, however, utilizing rehydrated dead seaweed in step b) of the inventive method is less preferred. Preferably, the biomass is also fresh.

To ensure that the biomass utilized at step b) of the inventive method is a live and fresh biomass, preferably step b) takes place within 15 days from harvesting the seaweed, more preferably within 2 days from the harvest, even more preferably within 24 hours from the harvest, most preferably within 4 hours from the harvest. After carrying out step b), the exudated seaweed may still be recognizable as seaweed botanically and taxonomically as the exudation process used in the inventive method is a natural process.

Preferably, in step b), the seaweed undergoes a natural exudation process, i.e. the exudation of the seaweed is not impacted by the application of vacuum, pressure or mechanical treatments such as crushing, milling, pressing, filtering and the like. A natural exudation process is an active physiological process by which the plant cells transport components internally to the plant, i.e. mainly water, from inside to the surface of the seaweed as an exudate juice. The natural exudation process can be influenced by temperature and humidity and may take place faster when these are increased. The exudate juice typically contains water, protein, sea and seaweeds salts, pigments, phytohormones, gums, and other components. The natural exudation process is typically a healing and defensive action in response of being harvested. The escape of the juice from seaweed is comparable to sweating and occurs from vessels through pores and breaks in cell membranes. Since the exudated juice is a mineral-, protein-, gum-rich and natural juice, it can be further processed, e.g. utilized to make feed.

The exudation process at step b) preferably takes place under carefully adjusted conditions, e.g. in an environment (hereinafter the "exudation environment") containing at least 50 wt % moisture, more preferably at least 70 wt % moisture, even more preferably at least 80 wt % moisture, even more preferably at least 90 wt % moisture, most preferably at least 95 wt % moisture. To reach the high moisture content of the exudation environment, water, preferable seawater, can be added or sprinkled onto the seaweed or inside the exudation environment.

Preferably, the exudation is carried out at an exudation temperature of at least 20° C., more preferably of at least 30° C., even more preferably of at least 40° C., yet even more preferably at least 50° C., yet even more preferably at least 60° C., most preferably at least 70° C. Preferably, said temperature is at most 150° C., more preferably at most 120° C., most preferably at most 90° C. Preferably, said temperature is between 40 and 150° C., more preferably between 50 and 120° C., most preferably between 60 and 90° C. Using such temperatures, guarantees an optimum exudation process.

The typical duration for exudation will vary by species, season of harvest, quantity of moisture present in the exudation environment and exudation temperature. Generally, the period of exudation will be at least 3 hours, preferably at least 8 hours, more preferably at least 12 hours, most preferably at least 24 hours. Preferably, the exudation period will be between 3 hours and 10 days, more preferably between 8 hours and 4 days, most preferably between 12 hours and 2 days.

The exudation process results in a biomass containing an exudated seaweed, i.e. a seaweed which is desiccated or dehydrated. Preferably said process is carried out to extract at least 5 wt % of the water present inside the seaweed, more preferably at least 10 wt %, most preferably at least 15 wt %. Preferably, the amount of extracted water is at most 50 wt % of the water present inside the seaweed, more preferably at most 30 wt %, most preferably at most 20 wt %. The amount of water inside the seaweed can be determined by taking samples of the seaweed at certain time intervals, and weighing the seaweed before and after drying it at a temperature of 120° C. until no weight change occurs.

A preservative can be added to the seaweed and/or the exudate juice during the exudation process to reduce bacterial and microbial content and thereby assist the exudation process. If added, it is preferred that the preservative is used in an amount of up to 1 wt % of the seaweed or its juice. The preservative may be an anti-microbial agent, e.g. formaldehyde.

Preferably, the environment in which the exudation step is carried out is a closed environment, i.e. an environment wherein the flow of air is preferably below 1 m/s.

During the exudation process, the biomass is preferably spread evenly and too high piling up of seaweed is preferably prevented. The areal density of the biomass layer during exudation is preferably between 2 and 50 Kg/m$^2$, more preferably between 5 and 20 Kg/m$^2$, most preferably between 10 and 15 Kg/m$^2$.

Preferably, in step b), the biomass is placed on a solid surface, which is preferably inclined to allow the exudation juice from being collected. The exudation environment is preferably created by enclosing the biomass placed on said surface within a closed, accommodating space to prevent air flow. The accommodating space has a side part and a top part and can have any shape suitable for enclosing the biomass. Preferably, step b) takes place at the harvesting location by placing the exudation environment at a location under direct sunlight. Preferably, the accommodating space is created by using a tarpaulin, a plastic foil, glass or plastic sheets and the like. Preferably, the accommodating space is sufficiently transparent to allow for the sunlight to reach the biomass. To ensure that the humidity and temperature inside the accommodating space remain within the desired ranges, a cooling or heating device can be used. The inventors observed that such a simple setup provides excellent results.

The exudated biomass may be subjected to an optional drying process before being cooked in brine solution. The drying step preferably decreases the amount of moisture contained by the exudated biomass to at most 40 wt % based on the weight of the biomass. Preferably, the moisture content of the dried biomass is at most 35 wt %, even more preferably at most 30 wt %, most preferably at most 25 wt %. Preferably, the moisture content of said dried biomass is at least 5 wt %, more preferably at least 10 wt %, most preferably at least 15 wt %. Drying the exudated biomass before cooking, may allow an easier manipulation thereof.

After the optional drying and before being cooked, the exudated biomass is preferably rehydrated by the addition of water, which can be fresh or seaweed water. The rehydration preferably results in a rehydrated biomass having a DS of at least 20 wt %, more preferably at least 30 wt %, most preferably at least 40 wt %. Preferably, the DS is at most 80 wt %, more preferably at most 70 wt %, most preferably at most 60 wt %. Preferably, said DS is between 20 and 80 wt %, more preferably between 30 and 70 wt %, most preferably between 40 and 60 wt %.

Any drying method can be used to reduce the moisture content of the biomass. An advantageous drying method is low temperature drying using dehumidified air. Such drying method have the ability to preserve heat sensitive compounds of the seaweed such as proteins, fibers, starch and other nutrients and hence retaining seaweed quality. Other techniques may include ventilated chamber drying, oven drying, sun drying, (forced-flow) evaporation, flash drying, zeolite drying, fluidized bed drying, and the like.

The exudated biomass (whether or not dried and rehydrated), is subsequently cooked in a brine solution to obtain a cooked biomass. The brine is an aqueous solution containing at least one salt and having a salt concentration at room temperature (20° C.) of preferably at least 3 wt % relative to the total weight of the solution. Preferably, the concentration of salts is at least 5 wt %, more preferably at least 7 wt %, most preferably at least 10 wt %. Preferably, said salt concentration is at most 50 wt %, more preferably at most 40 wt %, most preferably at most 30 wt %.

The cooking preferably takes place at a cooking temperature of at least 85° C., more preferably at least 86° C., even more preferably at least 88° C., most preferably at least 90° C. Preferably, the cooking temperature is at most 100° C., more preferably at most 98° C., even more preferably at most 96° C., most preferably at most 95° C. Preferably, the cooking temperature is between 85 and 100° C., more preferably between 86 and 96° C., even more preferably between 88 and 96° C., most preferably between 90 and 95° C.

The cooking time is preferably at least 25 minutes, more preferably at least 30 minutes most preferably at least 35 min. Preferably, the cooking time is at most 60 min, more preferably at most 55 min, even more preferably at most 50 min, most preferably at most 40 min Preferably, the cooking time is between 25 and 60 min, more preferably between 30 and 55 min, even more preferably between 30 and 50 min, most preferably between 30 and 40 min.

The cooking step can be carried out by contacting the biomass with brine solution in a bath of said solution or a succession of baths of said solution. During the cooking process, preferably enough brine solution is used to cover the seaweed entirely. Preferably care is taken to prevent evaporation of the brine solution and a change in the salt concentration, e.g. by carrying out the cooking in a closed vessel. Alternatively, water can be added during the cooking to prevent the seaweed from being exposed to air.

A brine solution which has been found to be very effective for the purpose of the invention is a solution of sodium or potassium chloride. It is however understood that any salts other than sodium or potassium chloride can be used, non-limiting examples including other chloride salts, sulphates, nitrates, carbonates, phosphates, salts of organic acids and combinations thereof. The only qualification is that the salt should be sufficiently soluble to permit the formation of a brine solution at the required concentrations. It is also preferred that the salt is not excessively acidic nor basic in its reaction, namely, in aqueous solution, the pH of the solution is preferably between 6.0 and 10.0. If the produced seaweed-based powder is intended for being utilized in food, feed, personal care or pharma products, preferably the salt is a salt whose presence is allowed in such products.

The inventors observed that such careful cooking process may prevent the degradation of the seaweed and help in producing powders with excellent properties. Even more surprisingly, the inventors observed that the cooking step may improve the dispersability of the inventive powder. It was observed that the inventive powder can be homogeneously dispersed inside an aqueous medium without the occurrence of lumps or particulates whereas non-cooked seaweeds produced visible particulates. After cooking, the biomass may be subjected to a filtration step to remove the water before the subsequent washing step. The filtration can be accomplished by any suitable type of equipment of which many are well known, e.g. filter press cylinder type filter, or the like. If desired, a centrifugal machine can also be used.

The inventors also observed that the combination of exudation and cooking led to a seaweed-based powder having an optimum combination of colour, taste and rheological properties.

According to step e) of the inventive process, the biomass is washed. Any washing method can be used as for example rinsing under a flow of water, placing the biomass in a volume of water and combinations thereof. The washing may be carried out in one or several water baths, in a tank provided with suitable agitator means or in any washing system such as batch or continuous systems, in co- or counter-current configurations. Good results were obtained when the biomass was rinsed several times with fresh water.

Before being dried, the washed biomass can be subjected to a filtration step to remove the water therefrom and aid drying. The filtration can be accomplished by any suitable type of equipment of which many are well known, e.g. filter press, cylinder type filter, presses, sieves, or the like. If desired, a centrifugal machine can also be used.

The washed biomass is dried to a moisture content suitable to permit mechanical manipulation of said biomass. Any types of driers can be used, like vacuum driers, drums driers, air lift driers, etc. Preferably, the moisture content of the dried biomass is at most 25 wt %, more preferably at most 20 wt %, even more preferably at most 15 wt %, most preferably at most 12 wt %. Preferably, the moisture content of said biomass is at least 4 wt %, more preferably at least 6 wt %, even more preferably at least 8 wt %, most preferably at least 10 wt %. Preferably, said moisture content is at most 20 wt %, more preferably at most 15 wt %, most preferably at most 12 wt %. Preferably, said moisture content is between 4 wt % and 20 wt %, more preferably between 6 wt % and 15 wt %, most preferably between 8 wt % and 12 wt %.

The dried biomass may be transformed into a seaweed-based powder by using a mechanical treatment. Mechanical treatments include for example cutting, milling, pressing, grinding, shearing and chopping. Milling may include for example, ball milling, hammer milling, conical or cone milling, disk milling, edge milling, rotor/stator dry or wet milling, or other types of milling. Other mechanical treatments may include stone grinding, cracking, mechanical ripping or tearing, pin grinding, burr grinding, or air attrition milling. The mechanical treatment can be configured to produce powders with specific morphology characteristics such as for example, surface area, porosity, bulk density, and in case of fibrous seaweed, fibre characteristics such as length-to-width ratio.

If desired, the obtained powder can be passed through a screen, e.g. having an average opening size of 0.25 mm or less.

The biomass may at any step during the process, but preferably after step b), be subjected to a sterilisation step to reduce the microbiota thereof and/or eliminate the harmful species. It is known that the surface of seaweeds supports a diverse microbiota (such as fungi, bacteria, viruses, spore forms, etc.), generally within biofilms, some species being harmful to humans, e.g. *Escherichia coli* and *Enterococcus*. Sterilisation may be achieved by applying the proper combination of heat, irradiation, high pressure and filtration. Heat treatments in the presence or absence of water are known to reduce the microbial levels. For example, a treatment of seaweed for at least 10 minutes at 121° C. in a humid environment is known to ensure sterility. Other sterilisation methods including irradiation with gamma rays or microwaves, ozone treatment, pulsed light treatment, disinfection with alcohol and combinations thereof may be used.

The powder obtained/obtainable by the inventive method has advantageous properties as indicated hereinbefore and can be used to enhance the properties of various products containing thereof. Thus the invention also relates to a seaweed-based powder obtained/obtainable by the inventive method.

The inventive powder or any of the compositions of the invention may form part of (or be) a food or feed ingredient or product. Thus, an aspect of the invention relates to a food or feed ingredient comprising the inventive powder or any of the compositions of the invention. In the present context "food" refers to eatable material suitable for human consumption, whereas feed refers to eatable material suitable for animal consumption. The food or feed ingredient may also form part of a food or feed product.

The invention further relates to an edible product comprising the inventive powder. In particular, the invention relates to a food or a feed product containing the inventive powder and a nutrient. By food product is herein understood a product edible by humans. By feed product is herein understood a product edible by animals. Preferably, the food product is chosen from the group consisting of bakery products, convenience products, beverage products, dairy products, confectionary products, frozen products, savoury products, meat products, dipping products, egg-based products, fat-spread products, seafood-based products; snack food products and ready made meals and foods. Without being bound to any theory, the inventors believe that the dynamics and kinetics of the nutrient uptake by the one ingesting said food or feed product may be positively influenced by the advantageous properties of the inventive powder. In particular the inventive powder may enable an optimization of the transport, diffusion, and dissolution phenomena relevant to food functionalities (nutritional, sensory, and physicochemical). Moreover, said products may be easily designed to have specific flow behaviors, textures and appearances. Thus, the ability of the inventive powder to optimize said food functionalities may be highly beneficial for the design of food structure, which together with the classic needs (e.g. texture and mouthfeel), may enhance the impact upon wellness and health, including modulated digestion to trigger different physiological responses.

The inventive powder or any of the compositions of the invention may also be used in the manufacturing of industrial products, e.g. sealants, adhesives, paper, and other building materials.

The inventive powder is suitably used in the production of a large variety of food compositions. Examples of food compositions comprising thereof, to which the invention relates, include: luxury drinks, such as coffee, black tea, powdered green tea, cocoa, adzuki-bean soup, juice, soya-bean juice, etc.; milk component-containing drinks, such as raw milk, processed milk, lactic acid beverages, etc.; a variety of drinks including nutrition-enriched drinks, such as calcium-fortified drinks and the like and dietary fibre-containing drinks, etc.; dairy products, such as butter, cheese, yogurt, coffee whitener, whipping cream, custard cream, custard pudding, etc.; iced products such as ice cream, soft cream, lacto-ice, ice milk, sherbet, frozen yogurt, etc.; processed fat food products, such as mayonnaise, margarine, spread, shortening, etc.; soups; stews; seasonings such as sauce, TARE, (seasoning sauce), dressings, etc.; a variety of paste condiments represented by kneaded mustard; a variety of fillings typified by jam and flour paste; a variety or gel or paste-like food products including red bean-jam, jelly, and foods for swallowing impaired people; food products containing cereals as the main component, such as bread, noodles, pasta, pizza pie, corn flake, etc.; Japanese, US and European cakes, such as candy, cookie, biscuit, hot cake, chocolate, rice cake, etc.; kneaded marine products represented by a boiled fish cake, a fish cake, etc.; live-stock products represented by ham, sausage, hamburger steak, etc.; daily dishes such as cream croquette, paste for Chinese foods, gratin, dumpling, etc.; foods of delicate flavour, such as salted fish guts, a vegetable pickled in sake lee, etc.; liquid diets such as tube feeding liquid food, etc.; supplements; and pet foods; creamers (dairy and non-dairy), condensed milk, alcoholic beverages, in particular those containing dairy products, e.g. Irish cream whiskey and the like; and sport drinks. These food products are all encompassed within the present invention, regardless of any difference in their forms and processing operation at the time of preparation, as seen in retort foods, frozen foods, microwave foods, etc. Due to its neutral taste and odour, such food products are not, or are less, affected by the natural taste or smell of the seaweed.

The present invention further relates to the use of the inventive powder in dairy products, e.g. yogurt {e.g., spoonable, drinkable, and frozen), sour cream, cheese products, sauces (cheese and white), pudding, and frozen desserts. Unexpectedly, it was observed that the inventive powder can be used in dairy products with a resulting smooth texture and essentially without any loss in viscosity or creaminess. Said inventive powder can be used as an ingredient or as an additive to dairy products, i.e. in addition to the fat contained by such products. Alternatively, said inventive powder can be used to substitute some or even all of the fat in dairy products, to obtain reduced-fat or fat-free products in which case such use may result in a decreased caloric content of the final dairy product {e.g., a reduction of at least 10%, or at least 50%).

As used herein, additive means any substance added to a base material in low concentrations for a definite purpose. In the United States, the Food and Drug Administration sets the allowable levels of food additives after evaluating the safety and toxicity of the additive. Additives may be essential to the existence of the end product, such as the use of emulsifiers in mayonnaise or leavening agents in bread products. Alternatively, additives may perform a secondary function, e.g. may function as thickeners, flavouring agents, or colouring agents. The inventive powder described herein may be used as additive in dairy products but also as an ingredient.

Dairy product as used herein means milk or any food product prepared from non-vegetable milk (e.g., cow milk, sheep milk, goat milk, and the like), whether in a dry or a non-dry form, including butter, cheese, ice cream, pudding, sour cream, yogurt (e.g., spoonable, drinkable, and frozen) and condensed milk. In a less preferred embodiment, products manufactured with vegetable milk, e.g. soy milk, and vegetable milk-based products can also be used in the examples described herein.

Cheese is herein understood as a food prepared from the pressed curd of milk, often seasoned and aged.

Lipid is a term describing a product comprising fats and/or fat-derived materials. Fat is herein understood as an ester of glycerol and three fatty acids. A fatty acid is a carboxylic acid typically having a carbon chain from 4-22 carbon atoms in length and usually having an even number of carbon atoms in the chain. The fatty acids can be saturated, i.e., containing no double bonds, or unsaturated, i.e., containing one or more double bonds. Fats can be found both in animal products and in some plant products.

Ice cream is herein understood as a smooth, sweet, cold food prepared from a frozen mixture of milk products and flavourings. In the United States ice cream contains a minimum of 10% milkfat and 10% non-fat milk solids (see, 21 C.F.R. § 135.110). However, the disclosure is not limited to this specific range, as the required percentages of milkfat and non-fat milk solids in ice creams can vary in other countries or jurisdictions.

Yogurt is herein understood as a dairy product produced by culturing cream, milk, partially skimmed milk, or skim milk with a characterizing bacterial culture that contains lactic acid-producing bacteria, such as *Lactobacillus delbrueckii* ssp. and *Streptococcus thermophilus*. Exemplary yogurts include, but are not limited to, spoonable yogurt, yogurt dip, frozen yogurt, and drinkable yogurt. By definition in 21 C.F.R. § 13 1.200, regular yogurt in the United States has a milkfat content of at least 3.25%. The fat content of regular yogurts typically ranges from 3.25% to about 3.8%, although there are yogurts on the market with a fat content of about 10%. As defined in 21 C.F.R. § 131.203, in the United States low-fat yogurts have not less than 0.5% milkfat and not more than 2% milkfat. A non-fat yogurt has less than 0.5% milkfat in the United States as defined in 21 C.F.R. § 131.206. However, other ranges may be observed in other countries.

Dairy products may be prepared using methods known to those skilled in the art, e.g. WO2009/079002, except that the inventive powder is added or used to replace some or all of the fat in said products. Said inventive powder can be added at one of several points during the manufacture of the dairy product, e.g. they may be added to the milk prior to pasteurization. Said inventive powder can be added in its dry form or, alternatively, an aqueous dispersion may be prepared by dispersing said inventive powder in an aqueous environment and then adding said dispersion to the milk.

The inventive powder can be used to substitute some or all of the fat in the dairy product. Preferably, said inventive powder are used in an amount sufficient to substitute at least 5% of the fat, more preferably said amount substitutes at least 10% of said fat, even more preferably at least 20%, yet more preferably at least 50%, yet more preferably at least 75%, most preferably essentially all fat is replaced by said inventive powder.

The inventive powder is preferably added to the dairy product in an amount of up to 10 wt % relative to the weight of the product, more preferably up to 7 wt %, even more preferably up to 5 wt %, most preferably up to 3 wt %. Preferably said amount is between 0.01 and 10 wt %, more preferably between 0.03 and 7 wt %, most preferably between 0.05 and 5 wt %.

The inventive powder and any composition in accordance with the invention may also be used in cosmetic formulations. The invention therefore relates to a cosmetic formulation comprising said powder or said compositions. Non-limiting examples of cosmetic formulations include basic cosmetics (facial toilet, milks, creams, ointments, lotions, oils and packs), facial washes, skin washes, hair cosmetics such as shampoo, rinse and the like, and makeup cosmetics such as lipstick, foundation, blush, eye shadow, mascara, and the like.

The inventive powder and any composition in accordance with the invention may also be utilized into bath salts, tooth paste, deodorizers, sanitary cottons, wet tissues, and the like. The invention therefore also relates to such products containing said powder or said compositions Any feature of a particular embodiment of the present invention may be utilized in any other embodiment of the invention. The word "comprising" is intended to mean "including" but not necessarily "consisting of" or "composed of." In other words, the listed steps or options need not be exhaustive. It is noted that the examples given in the description below are intended to clarify the invention and are not intended to limit the invention to those examples per se. Similarly, all percentages are weight/weight percentages unless otherwise indicated. Except in the examples and comparative experiments, or where otherwise explicitly indicated, all numbers in this description indicating amounts of material or conditions of reaction, physical properties of materials and/or use are to be understood as modified by the word "about". Unless specified otherwise, numerical ranges expressed in the format "from x to y" are understood to include x and y. When for a specific feature multiple preferred ranges are described in the format "from x to y", it is understood that all ranges combining the different endpoints are also contemplated. For the purpose of the invention ambient (or room) temperature is defined as a temperature of about 20 degrees Celsius.

Methods of Measurement

Cl⁻ amount was measured by potentiometric titration (Metrohm) with $AgNO_3$. 200 to 300 mg of the sample ($W_{sample}$) were added to 150 ml osmosis water in a 250 ml beaker. The sample was stirred until a homogeneous dispersion of the sample was achieved. 4 to 5 drops of fuming nitric acid were added to the sample. The titration was carried out with a potentiometer (682 Titroprocessor, Metrohm) and a combined electrode $Ag/AgNO_3$. The wt % of chlorides can be directly calculated with the formula: % $Cl^- = V \times C \times M[Cl] \times 100 / W_{sample}$ with M[Cl] being 35.5 g/mol and where V is the volume of $AgNO_3$ (in mL) solution utilized and C is its concentration, i.e. 0.1N.

AIM was measured by dispersing 0.5 g of sample ($W_{sample}$) in 150 ml osmosis water in a 250 mL beaker. 1.5 mL of concentrated sulfuric acid were added thereto. The beaker was covered with plastic foil to prevent evaporation and heated on bain-marie at boiling temperature for 2 h. The dispersion was centrifuged at 4000 rpm (equivalent to 3250 g) for 10 minutes. The total mass ($W_{filter+dish}$) of a AP 25 filter and a crystallizing dish was determined.

The acidic dispersion was filtered and rinsed with osmosis water at 50° C. until its pH remained neutral (as check with a pH paper)—about 500 mL water were used.

The filter with the sample was allowed to dry overnight at room temperature and further dried in an oven at 60° C. for a day and the total weight of the sample, filter and dish was determined ($W_{final}$). AIM (%)=[($W_{final}$−$W_{filter+dish}$)/$W_{sample}$]×100.

AIA was measured as follows: 2,000 (two) grams ($W_{sample}$) of sample were placed on a silica or platinum crucible, burnt for about one hour on a hot plate at 500° C. and subsequently placed in a furnace at 550° C. for 16 h. The obtained ashes were added to a solution containing 10 ml concentrated HCl and 20 ml demineralized water. The solution containing the ashes was heated to 80° C. for about half an hour and subsequently filtered using a Whatman No 40 (ash free filter). The filter containing the ashes was rinsed with water until no Cl⁻ were detected in the sample. The presence of Cl⁻ in the sample was checked with $AgNO_3$ (the precipitation of AgCl signifies the presence of Cl⁻).

A second silica or platinum crucible was placed in an oven at 550° C. for 10 minutes and then cooled to room temperature in a desiccator. Subsequently, the crucible was weighted ($W_{crucible}$) in a water-free environment. The filter with the ashes was placed on the crucible and heated progressively on a hot plate starting at room temperature up to 500° C. for a period of time of at least 1 hour. The crucible was then transferred to a furnace and heated at 800° C. for 16 h. After being cooled at room temperature in a desiccator, the crucible was weighted again ($W_{crucible+ash}$) in a water-free environment.

AIA (%)=[($W_{crucible+ash}$−$W_{crucible}$)/$W_{sample}$]×100.

D50, D90: The method of determining the particle size distributions is complying with method <429> of the United Stated Pharmacopeia (USP40), and is based on the ISO standard 13320-1. A sample powder is first poured inside a vibrating hopper to feed with a regular flow a Mastersizer 3000 (Malvern). Using an air disperser device, the powder particles were blown through a laser beam with an obscuration of the light between 1 and 15%, to reach a sufficient signal-to-noise ratio of detector and to avoid multiple scattering. The light scattered by particles at different angles is measured by a multi-element detector. The use of red and blue light, coupled to the Mie theory allows the calculation of the volumetric size distribution, where particles were considered as spheres and hence an equivalent sphere size was determined. From the obtained size distribution the cumulative volume fractions at 10, 50 and 90% were determined to give D10, D50 and D90, respectively. The median diameter D50 gives an idea of the particle size of the powder, while D10 and D90 allows to quantify finer and coarser particle sizes.

CIELAB L*, a* and b* represent the most complete colour space specified by the International Commission on Illumination (Commission Internationale d'Eclairage). It describes all the colours visible to the human eye and was created to serve as a device independent model to be used as a reference. The L* and b* values of a sample are obtained by placing the sample in a glass cell (filled about half) of a colorimeter. The used colorimeter was a Minolta CR400 Colorimeter. The L* vary from 100 (white) to 0 (black). The higher the L* value, the brighter and whiter the colour. The measurement "a*" is a red or green response departing from gray, i.e. positive a* is red, negative a* is green. The measurement "b*" is a yellow or blue response departing from grey, i.e. positive b* is yellow, negative b* is blue.

The Aerated Bulk Density (ABD) may be determined using any conventional method of measuring the ABD of powders, e.g. by measuring the mass of an empty container (g) of known volume and by measuring the mass of the same container filled with the powder to be tested. The difference between the mass of the filled container and the mass of the empty container divided by the volume (ml) occupied by the powder in said container, gives the value of the aerated bulk density. For example a device known as Powder Tester type PTE (supplied by Hosokawa) including a 100 ml container, a scoop used for filling and a scraper may be utilized to determined said ABD. It is preferred that the powder is first screened through a sieve with apertures of at most 4000 μm, most preferably at most 2000 μm and the density measurements are performed on the product not retained by the sieve. It is preferred that any compaction of the powder is avoided when filling the container, e.g. by carefully and slowly pouring the powder thereinside.

Rheology Measurements:

Sample Preparation for Rheology Measurements:

Reconstituted skimmed milk was used as the aqueous medium. The skimmed milk in powdered form was provided by Isigny-Ste-Mère (Isigny. France). The skimmed milk was reconstituted by dissolving powdered skimmed milk at 10% w/w in ultrapure water (18.2 MΩ·cm resistivity) under stirring for 4 hours at room temperature. In particular, to prepare 1000 g of reconstituted skimmed milk, 108.66 g of skimmed milk powder (DS=92.03 wt %) were dissolved in 891.34 g of ultrapure water. Dispersions of various seaweed-based powders were prepared in variable proportions (0.1 to 1 w/w. dry matter basis) in reconstituted skimmed milk. The seaweed-based powders were weighed in the suitable final proportion, thoroughly mixed with 5 wt % sucrose (to promote the rehydration) and slowly dispersed in the reconstituted skimmed milk under magnetic stirring (500 rpm). Stirring was maintained for 30 minutes at room temperature. Subsequently, the sample was heated to 80° C. for about 30 minutes under stirring at 500 rpm and held at this temperature for an additional 3 minutes.

Measurements of Storage Modulus G':

Rheological measurements were carried out using a MCR 302 controlled-stress rheometer (Anton Paar Physica) equipped with a 50 mm plate-and-plate geometry with both upper and lower surface crosshatched. The rheometer is also equipped with a Peltier temperature controller. The gap was fixed at 1 mm. Before measurements, samples were covered by a thin layer of paraffin oil on the edge of the sample to avoid evaporation during measurements. Dynamic oscillatory or viscoelastic measurements were selected to evaluate the gelation kinetics and texturizing properties of each formulated system. For these measurements, the sample was poured onto the MCR 302 plate pre-heated at 80° C. and subjected to a temperature sweep test (2° C./min) from 80° C. down to 10° C., followed by a time sweep experiment for 15 minutes at a frequency of 0.4 Hz to ensure that the system reach an equilibrium state after this considered time at 10° C. due to reorganization (structural rearrangements). Subsequently, the sample was subjected to a frequency sweep from 100 to 0.01 Hz at a constant shear strain in the linear viscoelastic region (LVE) fixed at 0.2%. To ensure that viscoelastic measurements were carried out in the LVE domain, strain sweep experiments were conducted from 0.01% to 100% at 0.4 Hz.

In all these rheological experiments. each measurement was performed at least in duplicate.

Data Processing: G'

The G' values considered in this patent were collected from the mechanical spectra (frequency sweep test) at 0.4 Hz at 10° C. In fact as the mechanical spectra represents the real structural behavior of the obtained gels, it appeared suitable to use this G' value as the most appropriate parameter.

Based on the G' values obtained for all investigated samples at various concentrations, a power-law relationship (see Formula 1) was used to describe the data. Note that $C_0$ represents the lowest concentration below which there is no gel-like behavior or implicitly the critical gelling concentration. C is the seaweed-based powder concentration (dry matter basis); n represents the exponent value of the fitting model; k and k' are constant factors of the fitting model $$G'=k'^{*}(C-C_0)^n \quad \text{Formula 1}$$

To compare samples, Formulas 2-4 were used:

$$G'=p^{*}k^{*}C^n \quad \text{Formula 2}$$

$$G'_{sample\,A}=k^{*}C^n \quad \text{Formula 3}$$

$$G'_{sample\,B}=p^{*}k^{*}C^n \quad \text{Formula 4}$$

where p is a translational shifting factor. If p=1, that means sample A displays similar gel strength as sample B; if p>1. that means sample B displays higher G' than Sample A; if p<1 that means sample B displays lower G' than Sample A.

Data Processing: $C_0$

Figure 1:
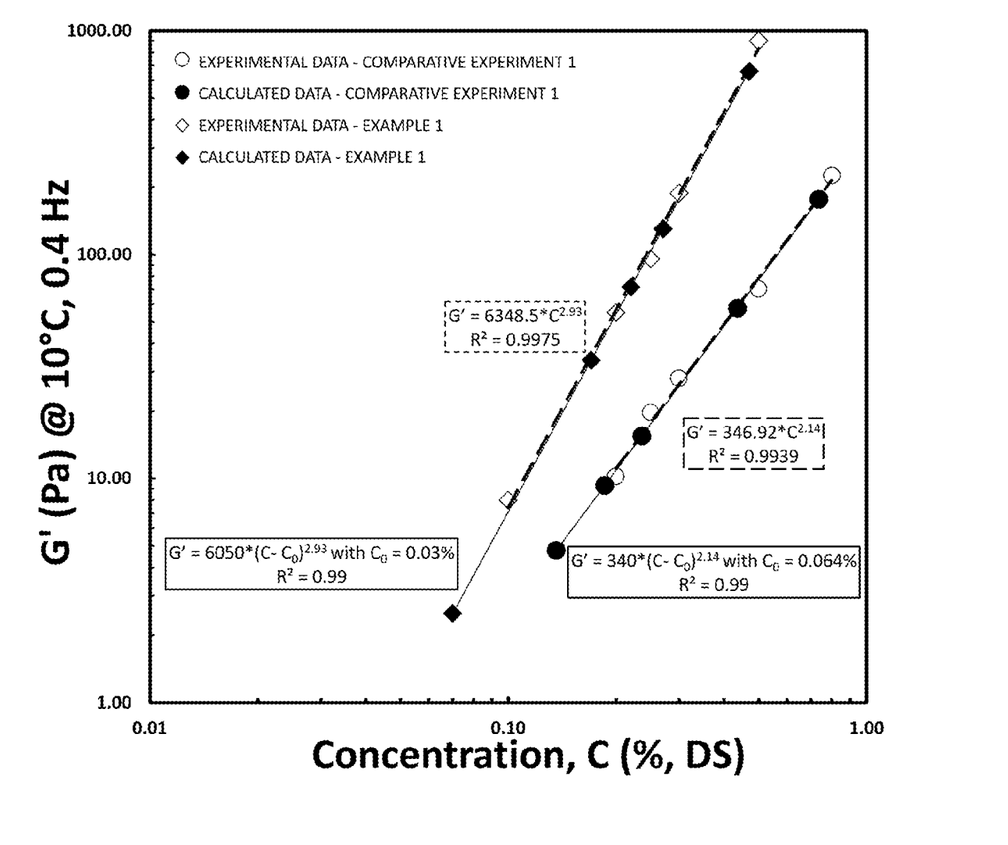
FIG. 1 shows the methodology to determine the $C_0$ of a seaweed-based powder sample.

For the determination of $C_0$, the following steps were respected:

(i) The storage modulus G' values collected from the mechanical spectra as described above were plotted as a function of seaweed-based powder concentration, C (%, DS), in logarithmic scales (see FIG. 1).

In FIG. 1, the dashed lines and the solid lines represent the fitting of the power law formulas 3 and 1, respectively, to the experimental data (raw data) and to the estimated data. The data utilized in FIG. 1, belongs to Example 1 and Comparative Example 1, respectively.

(ii) Following the approach described in literature (e.g. Agoda-Tandjawa, G., Dieudé-Fauvel, E., Girault, R. & Baudez, J.-C. (2013). *Chemical Engineering Journal*, 228, 799-805) equation $G'=kC^n$ was mathematically transformed in the form $G'=k'(C-C_0)^n$ using linear regression. In this second equation, k' represents the scaling factor, and $C_0$ the concentration below which no gel-like behaviour can be achieved. Note that the linear regression was performed for all investigated seaweed-based powders following the condition $G'=kC^n=k'(C-C_0)^n$, with both exponents (n) values being identical and $C>C_0$.

The validation of $C_0$ determined using the above fitting model was verified by evaluating the rheological behaviour of all seaweed-based powders in similar conditions as described previously in other to evidence the gel-like behaviour.

The invention will now be described with the help of the following examples and comparative experiments, without being however limited thereto.

Example 1: *Kappaphycus alvarezii* Based Powder

A number of fresh harvested (less than 6 h from the harvest) *Kappaphycus alvarezii* (*Eucheuma Cottonii*) seaweed samples were rinsed with seawater and used to make a biomass having a DS of about 10 wt %. Seawater from the location of the harvest was used. The biomass was placed on a wooden table to form a biomass bed having an areal density of about 10 Kg/m$^2$. The table was placed in a sunny location and covered with a transparent tarpaulin to fully enclose it and prevent air flow. Due to the action of the sun, the temperature under the tarpaulin reached about 60° C. and a humidity over 90%. The seaweed was allowed to naturally exude in this environment for a period of time between 24 h and 72 h depending on the weather.

After exudation, the tarpaulin was removed and the biomass was kept for another 24 h in open air under the sun for drying to reach a DS of about 73.5 wt %.

The biomass containing the seaweed was cooked in brine solution (100 g/L of KCl) at 90° C. for 30 minutes. The weight of the brine solution used for cooking was about 6 times the mass of the seaweed. After cooking, the brine solution was drained and the cooking operation was repeated in a new brine solution for 30 minutes at 90° C. After the second cooking, the brine solution was drained and the recovered seaweed was allowed to cool down at 30° C. in ambient air. After cooling down, the seaweed was washed 3 times with plenty of water.

The washed seaweed was then collected and milled at about 0.5-1 cm sized particles using coffee mill and dried using a vacuum dryer for 30 minutes at 60° C., which led to a final product of about 94.9% DS. The dried product was milled into a powder with a Retsch mill (final sieve at 0.25 mm) to reach the desired powder characteristics. The properties of the obtained seaweed-based powder are given in Table 1:

TABLE 1

| Property | | Exp 1 | Exp 2 |
|---|---|---|---|
| Chloride (Cl⁻) (%) | | 0.82 | 0.66 |
| AIM (%) | | 11.99 | 13.17 |
| AIA (%) | | 0.03 | 0.08 |
| Color | L* | 80.81 | 78.7 |
| | a* | 1.14 | 1.05 |
| | b* | 12.36 | 11.57 |
| Particle size | D50 (μm) | 109 | 134 |
| | D90 (μm) | 291 | 326 |
| | D10 (μm) | 24.3 | 23.8 |
| | D [4,3] | 137 | 157 |
| | Span | 2.38 | 2.26 |
| ABD | | 0.571 | 0.571 |
| G' (Pa) | | 189.38 | 188.82 |

Example 2: *Eucheuma spinosum* Based Powder

A number of fresh harvested (less than 6 h from the harvest) *Eucheuma spinosum* seaweed samples were rinsed with seawater and used to make a biomass having a DS of about 10 wt %. Seawater from the location of the harvest was used. The biomass was placed on a wooden table to form a biomass bed having an areal density of about 10 Kg/m2. The table was placed in a sunny location and covered with a transparent tarpaulin to fully enclose it and prevent air flow. Due to the action of the sun, the temperature under the tarpaulin reached about 60° C. and a humidity over 90%. The seaweed was allowed to naturally exude in this environment for a period of time between 24 h and 72 h depending on the weather.

After exudation, the tarpaulin was removed and the biomass was kept for another 24 h in open air under the sun for drying to reach a DS of about 75 wt %.

The biomass containing the seaweed was cooked in brine solution (250 g/L of KCl) at 90° C. for 30 minutes. The weight of the brine solution used for cooking was about 6 times the mass of the seaweed. After cooking, the brine solution was drained and the cooking operation was repeated in a new brine solution for 30 minutes at 90° C. After the second cooking, the brine solution was drained and the recovered seaweed was allowed to cool down at 30° C. in ambient air After cooling down, the seaweed were washed 2 times in plenty of water.

The seaweed material was then collected and milled at about 0.5-1 cm using coffee mill and dried using a vacuum dryer for 30 minutes at 60° C., which led to a final product of about 94.9% DS. The dried product was milled into a powder with a Retsch mill (final sieve at 0.25 mm) to reach the desired powder characteristics. The properties of the obtained seaweed-based powder are given in Table 2:

TABLE 2

| Property | | Exp 3 | Exp 4 |
|---|---|---|---|
| Chloride (Cl⁻) (%) | | 7.7 | 8.38 |
| AIM (%) | | 9.41 | 9.70 |
| AIA (%) | | 0.07 | 0.08 |
| Color | L* | 78.67 | 83.16 |
| | a* | 1.92 | 1.03 |
| | b* | 13.93 | 13.22 |
| Particle size | D50 (μm) | 143 | 83.9 |
| | D90 (μm) | 331 | 211 |
| | D10 (μm) | 19.7 | 13 |
| | D [4,3] | 161 | 100 |
| | Span | 2.17 | 2.36 |
| ABD | | 0.727 | 0.644 |
| G' (Pa) | | 35.45 | 42.94 |

Example 3 *Chondrus crispus* Seaweed-Based Powder

A fresh *Chondrus crispus* was harvested from the wild. It was processed like in Example 1 and was kept between 3 and 72 hours under a tarpaulin. In some instances, the seaweed was turned over during the exudation to allow a homogeneous exposure to sunlight. The seaweed was then sun dried over a period ranging from 1 to 3.5 days, depending on the weather, to reach a DS of about 65 wt % (approximatively 35 wt % moisture). The seaweed was further processed as in Example 1.

The dried biomass was subsequently placed in volume of tap water sufficient to cover the seaweed entirely and the seaweed was allowed to rehydrate for 1 h at room temperature without stirring. The rehydrated seaweed was then collected using a filter and a biomass having a DS around 40 wt % was obtained.

The biomass containing the rehydrated seaweed was cooked twice in brine solution (350 g/L of KCl) at 90° C. for 30 minutes. The weight of the brine solution used for cooking was about 16 times the mass of the seaweed. After cooking, the brine solution was drained and the recovered seaweed was washed by placing it in a volume of tap water at room temperature for 10 minutes. Enough water was used to completely cover the seaweed.

The seaweed was then collected using a filter and dried using a belt dryer for 30 minutes at 60° C. and led to a final product of about 94.3% DS. The dried product was milled into a powder with a Retsch mill (final sieve at 0.25 mm) and sieved at 0.25 mm.

Comparative Experiments 1-3

Fresh harvested (less than 6 h from the harvest) seaweeds were kept for 24 h in open air under the sun for drying to reach a DS between 60 and 95 wt %.

The seaweeds were then further dried in an oven at 60° C. overnight.

The dried seaweeds were milled into a powder with a Retsch mill (final sieve at 0.25 mm) and sieved at 0.25 mm. The properties of the obtained powders are given in Table 5 below.

TABLE 3

| Property | C.EXP.1 Cottonii | C.EXP.3 Chondrus |
|---|---|---|
| Chloride (Cl⁻) (%) | 21.8 | 0.7 |
| AIM (%) | 11.2 | |

TABLE 3-continued

| Property | | C.EXP.1 Cottonii | C.EXP.3 Chondrus |
|---|---|---|---|
| AIA (%) | | 0.2 | |
| Color | L* | 67.5 | 64.0 |
| | a* | 2.6 | 3.4 |
| | b* | 8.1 | 14.8 |
| Particle size | D50 (μm) | 117 | |
| | D90 (μm) | 276 | |
| | D10 (μm) | 19.7 | |
| | D [4,3] | 133 | |
| | Span | 2.191 | |
| G' (Pa) | | 28 | 99 |

Examples Dairy Products with Inventive Powders

The *Cottonii* powder of Example 2 has been tested in dairy desserts (creamy and gelled texture).

Creamy Desserts Recipes

The following process and recipe were used:
Process Steps:
1. All dry ingredients were pre-blended and dispersed into cold milk and cream;
2. Hydration 30 min
3. Pre-heating 63° C.
4. Homogenization at 80 Bars
5. Pasteurization 95° C. during 2 minutes
6. Sterilization 135° C. during 15 sec
7. Pre-cooling 75° C.
8. Cooling 10° C.
9. Storage in "a buffer tank" during 4 hours at 10° C.
10. Filling in pots
Ingredients:

TABLE A

Recipe of dairy creamy dessert

| % | COMPARATIVE | EXAMPLE |
|---|---|---|
| Skimmed Milk | Up to 100% | Up to 100% |
| Cream 35% | 8.20 | 8.20 |
| Skimmed Milk Powder | 2.00 | 2.00 |
| Sugar | 10.00 | 10.00 |
| Modified Starch C*PolarTex 06741 | 2.00 | 2.00 |
| Commercial texturizer (SATIAGEL) | 0.10 | |
| Inventive powder | | 0.14 |
| Beta Caroten | 0.03 | 0.03 |
| Vanilla | 0.12 | 0.12 |
| TOTAL | 100.00 | 100.00 |
| Dry Matter % | 24.1 | 24.1 |
| Fat % | 3.0 | 3.0 |
| Proteins % | 3.5 | 3.5 |

Impact on colour: by visual observation the impact on colour is negligible. No evident change from light cream was observed.

Gelled Dessert Recipe

Gelled desserts have been made with the following process and using the ingredients given in Table B, using the powder of Example 2 and a powder made from *Spinosum* with a process similar to that of Example 1.
Process: (1) All dry ingredients were pre-blended and dispersed into cold milk and cream; (2) Hydration 30 min; (3) Pre-heating 63° C.; (4) Homogenization at 80 Bars; (5) Pasteurization 95° C. during 2 minutes; (6) Sterilization 135° C. during 15 sec; (7) Pre-cooling 75° c.; (8) Filling in "a buffer tank" at 70° C. during 4 Hours; (9) Filling in pots.
Ingredients:

TABLE B

Recipe of dairy gelled dessert

| % | COMPARATIVE | EXAMPLE |
|---|---|---|
| Skimmed milk | Up to 100% | Up to 100% |
| Water | 10.00 | 10.00 |
| Cream at 35% Fat | 2.91 | 2.91 |
| Sugar | 10.00 | 10.00 |
| C*Gel ™ 03842 | 2.00 | 2.00 |
| Commercial texturizer (SATIAGEL) | 0.18 | |
| Inventive powder (blend of 57% Cottonii/43% Spinosum) | | 0.35 |
| Vanilla flavour | 0.12 | 0.12 |
| Betacaroten | 0.02 | 0.02 |
| TOTAL IN % | 100.00 | 100.00 |
| Dry Matter % | 19.7 | 19.7 |
| Fat % | 1.2 | 1.2 |
| Proteins % | 2.5 | 2.5 |

Impact on colour: by visual observation the impact on colour is not critical.

The invention claimed is:

1. A seaweed powder having an aerated bulk density (ABD) of at least 0.20 g/ml and a CIELAB L* value of at least 70, wherein the seaweed powder is essentially free of oxidizing or bleaching agents.

2. The powder of claim 1, wherein said powder is a naturally processed powder.

3. The powder of claim 1, wherein the seaweed is a red, a green, or a brown seaweed.

4. The powder of claim 1, wherein the seaweed is a red seaweed.

5. The powder of claim 1, wherein the ABD is at least 0.25.

6. The powder of claim 1, wherein the CIELAB L* value is at least 72.

7. The powder of claim 1, wherein the powder has a CIELAB a* value of at most 5.0.

8. The powder of claim 1, wherein the powder has a storage modulus (G') of at least 10 Pa as determined in an aqueous medium containing 0.3 wt % of the powder relative to the total weight of the aqueous medium.

9. The powder of claim 1, wherein the powder is not bleached with alkaline bases, oxidizing or bleaching agents, alcohols or combinations thereof.

10. The powder of claim 1, wherein the powder is free of any whitening pigment.

11. The powder of claim 1, wherein the ABD is at least 0.40.

12. The powder of claim 1, wherein the CIELAB L value is at least 76.

13. The powder of claim 1, wherein the CIELAB L* value is at least 78.

14. The powder of claim 1, wherein the seaweed is a non-extracted seaweed.

15. The powder of claim 1, wherein the seaweed comprises polysaccharides in an amount that is at least 70% of the naturally occurring amount of polysaccharides in the seaweed.

16. A composition comprising:
a seaweed powder having an aerated bulk density (ABD) of at least 0.20 g/ml and a CIELAB L* value of at least 70, wherein the seaweed powder is essentially free of oxidizing or bleaching agents; and a gum, wherein the gum is selected from the group consisting of guar gum, xanthan gum, locust bean gum, cassia gum, tara gum, konjac gum, alginate, agar, carrageenan, beta 1,3 glucans, starch, and combinations thereof.

17. A food or feed product comprising the powder of claim 1 or the composition of claim 16.

18. The food product of claim 17, wherein said product is selected from the group consisting of bakery products, convenience products, beverage products, dairy products, confectionary products, frozen products, savoury products, meat products, dipping products, egg-based products, fat-spread products, seafood-based products, snack food products, and ready made meals and foods.

19. An industrial product comprising the seaweed powder of claim 1 or the composition of claim 16.

* * * * *